Nov. 7, 1967 A. L. FLEMING ET AL 3,351,722
TELEPHONE AUTOMATIC TEST CIRCUIT
Filed June 1, 1964
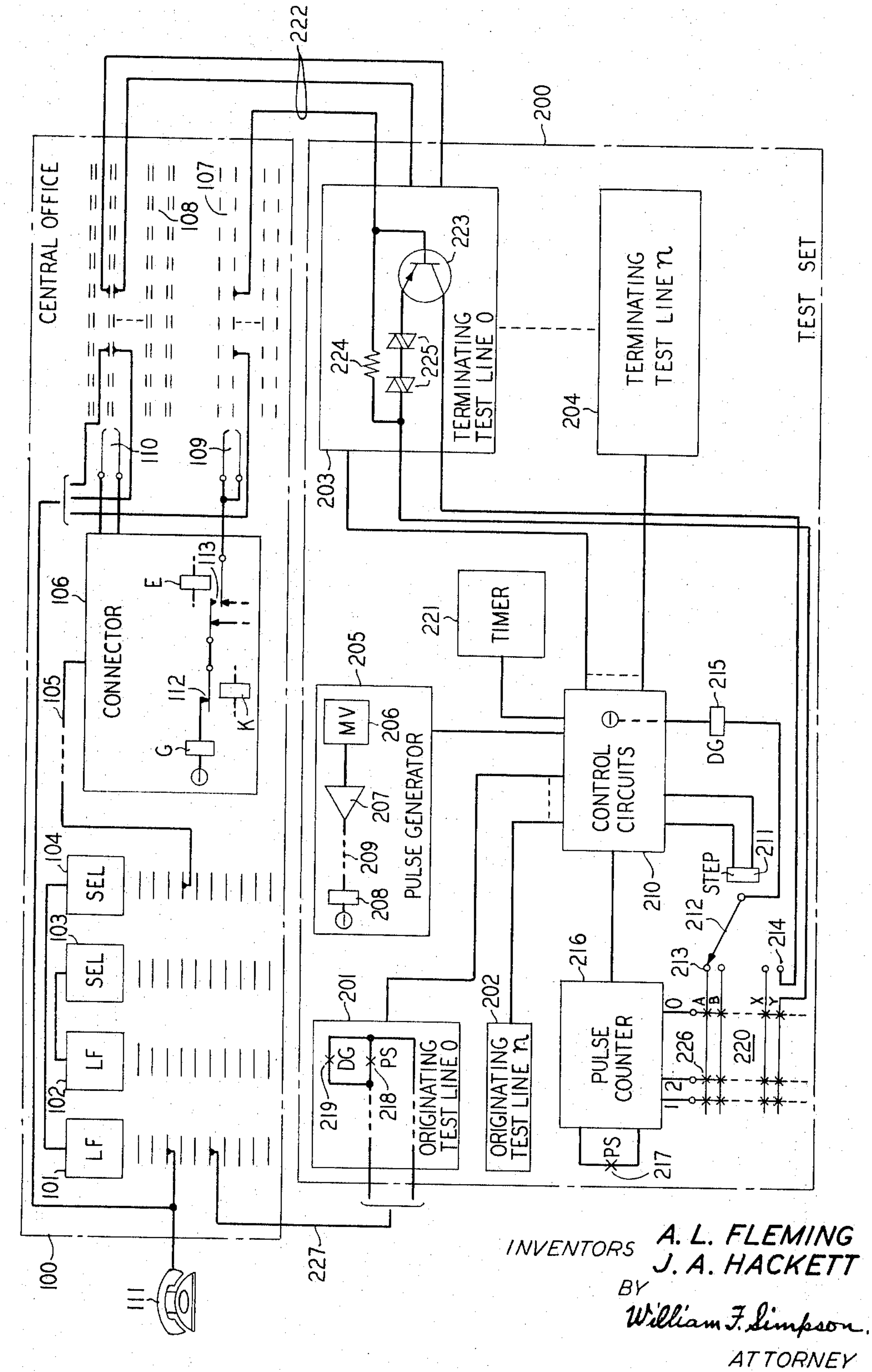
INVENTORS A. L. FLEMING
J. A. HACKETT
BY
William F. Simpson
ATTORNEY United States Patent Office 3,351,722 Patented Nov. 7, 1967

3,351,722
TELEPHONE AUTOMATIC TEST CIRCUIT

Alfred L. Fleming, Farmingdale, and John A. Hackett, Matawan, N.J., assignors to Bell Telephone Laboratories, Incorporated, New York, N.Y., a corporation of New York Filed June 1, 1964, Ser. No. 371,595
8 Claims. (Cl. 179—175.21)

This invention relates to telephone switching systems and particularly to apparatus for automatically testing such systems.

The exemplary embodiment of this invention is described herein with reference to step-by-step switching systems. The step-by-step switching system comprises a series of repetitive electromechanical switching units which direct a telephone call to a subscriber's line under control of dial pulses. The switches are mechanically similar, and several are operated in sequence to establish a talking path through the telephone switching system from the called subscriber to the calling subscriber. Basically three types of switches are employed, a line finder switch, a plurality of stages of selector switches, and a connector switch.

Prior to our invention test circuits have been devised which have incorporated in them originating test lines and terminating test lines such that when these lines are interconnected with the switching system the other portions of the test circuit originate calls from the originating test lines through the switching system to the terminating test lines. Tests may then be made on the various switching circuits, their functions, and the operations of various relays or component parts of these systems.

In these prior systems, if either the test set proper malfunctions or if any one or more of the switches malfunctions so that the test call is misdirected to a subscriber's line, ringing will be applied to this line if the line is idle and thus improperly call a subscriber. Such operations annoy the subscriber and take additional time of the repairman to inform a subscriber that the various pieces of equipment or apparatus are being tested.

An object to this invention is to provide an improved test set in which test calls will not and cannot be directed to a working subscriber's line.

A feature of this invention relates to pulse generating and control equipment for transmitting additional pulses if the test call is directed to any line other than a test line.

Another feature of this invention relates to a wrong number check circuit which checks the coincidence of the transmission of the last pulse to direct the switches to the desired called terminating test line and the arrival of the last switch in the train at the called test line terminals in response to this pulse. If the switch arrives at the desired terminal in response to this pulse, then the test circuit control circuits function to stop the transmission of further pulses. If, however, the switch does not arrive at the desired test line terminal in response to this final pulse, then additional pulses are generated which cause the final switch to step over all of the remaining terminals of the particular level or group. Thereafter the test set blocks and holds the switches so that the trouble may be found and corrected.

Briefly, in accordance with a specific embodiment of our invention, the sleeve terminal of the terminating test line is connected to one input of a coincidence circuit. The connector in stepping over this terminal will apply negative battery thereto through the busy test relay in the usual manner. The other input of the coincidence circuit is obtained from the pulse counting and control circuits in response to the transmission of the last pulse designating the called terminating test line. If these two conditions are coincident, then an output is obtained from the coincidence circuit and employed to stop the pulsing on the originating line and advance the test set to make further tests.

Alternatively, if these two voltage conditions are not obtained at substantially the same time, then no output will be obtained from the coincidence circuit so the pulse generation and control circuits continue to generate pulses which pulses are transmitted to the final switch causing it to step over all of the originating terminals in the group. The test circuit then times out or blocks in the usual manner and gives an alarm signal or indication whereupon the trouble in the test circuit or in the switch train may be found and corrected.

The foregoing and other objects and features of the invention may be more readily understood from the following description made with reference to the attached drawing which shows an exemplary step-by-step central office and an exemplary test set embodying our invention.

Rectangle 100 in the drawing represents an exemplary central office of the step-by-step type. Such central offices are described in a book entitled "Telephone Theory and Practice" by K. B. Miller, vol. 3, entitled "Automatic Switching and Auxiliary Equipment," published by McGraw-Hill Book Company Incorporated in 1933. While the invention may be incorporated in test sets for testing various types of central offices, the central office 100 is shown to be a step-by-step office having line finders such as 101 and 102 which are shown in FIG. 60 on page 107 of the above book by K. B. Miller. The office includes first selectors 103 and 104 and any desired number of intermediate selectors represented by the dotted line 105 and a connector circuit 106. The circuit details of an exemplary connector circuit is shown in FIG. 48 on page 75 of the above-identified Miller book. The busy testing circuit of the connector 106 comprising the relays G, K and E and their contacts are partially shown within the connector 106. This connector has two sets of brushes 109 and 110. The brushes 109 cooperate with the bank of sleeve terminals 107 while the brushes 110 cooperate with the bank of tip and ring terminals 108.

A representative subscriber's station 111 is shown. The subscriber's line connecting this station with the central office 100 is shown terminating in the line finder banks as well as the connector banks in the usual manner. The line circuit equipment, though not shown or represented, is nevertheless employed in the usual manner.

Upon the initiation of a call by the subscriber the line finder 101, for example, is set into operation and finds the subscriber's line. This line finder is directly connected with the first selector 104 so that when the subscriber's line is found dial tone will be returned to the subscriber from the first selector 104. The subscriber will then dial a desired number and cause the selector 104 and such intermediate selectors as may be provided to be actuated and extend a connection to the connector 106. In the step-by-step system the last two digits are employed to control or step the connector 106 in the usual manner. During the transmission of the last digit the selector will step around over the contacts of a given level which was selected by the first digit. During the rotary movement the winding of the G relay is connected through the break contacts 112 of the K relay and the operated contacts 113 of the E relay to the brush 109. As a result the battery through this G relay is connected to the various sleeve contacts over which brush 109 is stepped. If any of the lines are busy the G relay operates because the corresponding sleeve will have ground potential or ground connected to it.

When the brush 109 rests on the called number sleeve the E relay will release. If the G relay is operated when the E relay releases then busy tone is returned to the calling subscriber. If on the other hand the G relay is released when the E relay releases, then ringing current is applied to the tip and ring terminals through the brushes 110 to the called subscriber's line on which these brushes 110 and 109 are resting. This operation is described in greater detail in the above-identified book by Miller.

Rectangle 200 represents a portion of the test set modified in accordance with our invention. A typical test set similar to that represented by rectangle 200 in the drawing is described in greater detail in a patent application of J. G. Edwards, Ser. No. 220,434, filed Aug. 30, 1962 now Patent 3,265,820, Aug. 9, 1966.

Only those portions of the test set which have been modified in accordance with our invention and cooperate with the modified portions to provide the wrong number check circuits and operation are shown in a rectangle 200 representing this test set. Other features of the test set described in the above-identified copending application or still other features may be included in the test set which features operate in their usual manner.

As shown in the drawing the test set 200 is provided with a plurality of originating test lines such as 201, 202, etc. and a plurality of terminating test lines 203, 204, etc.

The originating test line 201 is interconnected with a set of line finder terminals in any suitable manner by conductors or cable 221. Likewise the terminating test line 203 is interconnected with a set of connected terminals by means of the cable or conductors 222. The other originating test lines and terminating test lines are connected with the central office switching equipment in a similar manner, when it is desired to transmit a plurality of simultaneous test calls through the central office switching equipment.

The test set also includes a pulse generator 205 which comprises among other elements a multivibrator 206 which is operated continuously and generates pulses of the desired characteristics of speed and percentage break. The output of the multivibrator 206 is connected through a relay driving amplifier 207 to a pulsing relay 208. The pulsing relay 208 thus opens and closes its contacts in accordance with the pulses generated by the multivibrator 206. This pulse generator may include other test and control equipment and circuits which operate in a usual manner to control the equipment in any manner desired.

A set of contacts in each originating test line circuit, such as contacts 218 in originating test line 201, are controlled by the pulse relay 208. These contacts cause the transmission of the desired dial or control pulses to the switching equipment. In addition contacts 217 are also controlled by the pulse relay 208. The contacts 217 control a pulse counting circuit 216. This pulse counting circuit may be of any suitable type of pulse counting circuit and is arranged so that a ground is applied to the leads 1, 2 through 0 upon or during the transmission of the corresponding numbered pulse. Thus during the transmission of the No. 1 pulse, ground is applied to the No. 1 conductor; during the transmission of the No. 2 pulse, ground is applied to the No. 2 conductor. Ground is similarly applied to the corresponding conductors during the transmission of the other pulses by the pulse relay 208 and the contacts such as 217 and 218 controlled thereby.

The ten outputs from the pulse counter 216 extend through a switch matrix 220; as shown in the drawing the conductors 1 through 0 form vertical elements of the matrix while the horizontal components are represented by the conductors A, B through X and Y. One such horizontal conductor is provided for each digit desired to be transmitted. A switch is provided at each crosspoint between the vertical and horizontal conductor and these switches are set manually in accordance with the value of the corresponding digit to be transmitted.

A stepping switch having a brush arm 212 is provided to successively connect the horizontal conductors of the matrix 220 through a DG or digit relay 215. The stepping switch is stepped by means of the stepping magnet 211 under control of the control circuits 210. Thus if two pulses are to be transmitted as the first digit, switch 226 will be operated and then the control circuits 210 set into operation. In addition the pulse generator is set to operate so that, upon the initiation of operation of the control circuit 210, the switch 212 will be set in the first position where its brush 212 is in contact with the terminal 213. Then upon the transmission of the second pulse ground is applied to the No. 2 conductor from the pulse counter 216. Since switch 226 is now closed the ground will extend from the pulse counter 216 over the A conductor contact 213 and switch arm 212 and then through the winding of the DG relay 215 to battery within the control circuit 210. As the result the relay 215 operates and causes contacts 219 to close and bypass the pulsing relay control contacts 218. Thus even though the pulse relay continues to operate and send pulses and even though the contacts 218 continue to open and close no further pulses will be transmitted from the originating test line circuit 201. Thus under the assumed conditions the first selector 104 will step to the second level and then hunt for an idle second selector or connector. Upon the completion of the transmission of the first digit over all of the originating test lines, which digit may be different from each line since a switch matrix 220 and a stepping switch 212 will be provided for each line, the control circuit 210 will operate the stepping switch magnet 211 which causes the brushes 212 to engage the next set of terminals. At the same time the next digit will be transmitted to the switching circuit or switches in the manner described above.

Each of these operations as well as other operations of the test set is timed by the timer 221. If each operation is completed within the specified time the test set advances to the next step or operation. If the operation is not completed within the required time the test set blocks and lights or operates alarms so that the trouble may be located and corrected.

During the transmission of the last digit of the test call the connector 106 will be stepped in a rotary direction. In addition the brushes 212 of the stepping switch will be advanced by the stepping magnet 211 to the last or final terminal 214. Under these circumstances the winding of the digit relay 215 is connected to the collector of transistor 223 in the terminating test line. This transistor operates as a coincidence device as will be explained.

The emitter of this transistor is connected through a number of varistors 225 to the last conductor in the switch matrix 220. Thus when the last pulse of the number intended to direct the switch 106 to the terminals of the terminating test line 203 is transmitted ground will be applied from the corresponding conductor of the pulse counter 216 and then through the operated manual switch of the matrix 220 to the emitter of the transistor 223 through the various varistors. These varistors are provided to provide sufficient biasing voltages to insure proper operation of the transistor 223.

If in fact the connector brush 109 of the connector 106 steps on to the sleeve terminal of the test line 203 in response to this same pulse from the pulse relay 208, then battery through the winding of the G relay, the normal contacts 112 of the K relay, the operated contacts 113 of the E relay, brushes 109 and sleeve terminal and then over the sleeve conductor of the cable 222 is connected to the base of the emitter 223. Thus with negative voltage applied to the base of the transistor 223 and a potential near ground applied to its emitter the transistor 223 becomes conducting and causes the digit relay 215 to be operated. The operation of this relay then closes contacts 219 which prevent the transmission of further pulses to the switch mechanisms. The operation of relay 215 or the closure of its circuits also causes the control circuits 210 to advance so that additional tests may be applied to the connector and other switches in the established switch train from the originating test line 201 to the terminating test line 203.

If in fact the connector 106 does not step the brush 209 to the sleeve of the test terminal of the terminating test line 203 in response to the last pulse designating the such set of test terminals, then battery will not be applied to the base of the transistor 223 at the same time that substantially ground potential is applied to the emitter of this transistor. Consequently, the transistor does not become conducting and the digit relay 215 is not operated and the control circuits 210 does not advance to the next test. Instead the pulse generator continues to operate the pulse relay 208 and since the DG relay contacts 219 are not closed the pulse relay causes the contacts 218 controlled thereby to transmit additional pulses to the switch train. These additional pulses continue to step the connector circuit 106 in a rotary direction. These additional pulses also cause the pulse counter 216 to apply ground to different ones of the leads 1 through 0 but since the corresponding matrix switch will not be closed ground is no longer applied to the emitter of the transistor 223. Thus the connector 106 is stepped to the last or tenth or eleventh step or to on overflow position where the test circuit will time out and apply holding ground to the originating test line terminal sleeve and hold the various switches so that the trouble may be ascertained and corrected. Thus none of the test calls will be misdirected to any subscriber's line.

In addition the timer 221 will time out and cause the test set to block and hold the switches as described in the above Edwards application so the trouble can be found and corrected.

It is to be understood that the above-described arrangements are illustrative of the application of the principles of our invention. Numerous other arrangements may be devised and applied to the same or other types of switching systems by those skilled in the art without departing from the spirit and scope of our invention.

What is claimed is:

1. In combination in an automatic switching system, comprising a plurality of automatically controlled switches, a plurality of lines and a test line, a test set for automatically transmitting control signals for controlling said switches to establish a path from said test set to said test line, and means operating upon the establishing of a path to a line other than said test line for transmitting additional control signals to advance one of said switches to overflow.

2. In combination an automatic switching system comprising a plurality of automatically controlled switches, a test line, a test set for automatically transmitting control signals for controlling said switches to establish a path from said test set to said test line, and means jointly responsive to the transmission of the last of said control signals and to the establishing of a path to said test line to prevent the transmission of further control signals by said test set.

3. In combination in an automatic switching system in accordance with claim 2 characterized in that said means jointly responsive to the transmission of the last of said control signals and to the establishing of a path to said test line also includes control means to advance said test set to the next test.

4. In combination an automatic switching system comprising a plurality of automatically controlled switches each responsive to a series of pulses, a test line designated by a plurality of series of pulses, a test set for automatically transmitting the plurality of series of pulses on a test call designating said test line to said switches to establish a path to said test line, a coincidence circuit comprising a transistor, means responsive to the transmission of the last pulse of the last series of pulses to apply a first input to said transistor, means responsive to the establishing of a path to said test line to apply a second input to said transistor, and means responsive to the concurrent application of both of said inputs to said transistor to prevent the further transmission of pulses on said test call.

5. In a telephone switching system in combination a plurality of lines annd a test lie, a plurality of switches responsive to control signals to establish paths to said lines, a test set having means for automatically initiating a test call and for transmitting control signals to said switches to control the establishing of a path to said test line, and means operative upon the establishing of a path to any line other than said test line in response to said control signals from said test set to transmit additional control signals from said test set to said switches.

6. A telephone switching system in accordance with claim 5 characterized in that said control signals are dial pulses.

7. A telephone switching system in accordance with claim 5 characterized in that coincident means is connected to said test line jointly responsive to the establishing of a path to said test line and to the transmission of a predetermined control signal from said test set to prevent the transmission of further control signals for said test call.

8. In combination a telephone system in accordance with claim 7 characterized in that said control signals are dial pulses and further characterized in that said coincident means includes a transistor having one input connected to said test line and another input responsive to control signals from said means for transmitting control signals.

No references cited.

KATHLEEN H. CLAFFY, *Primary Examiner.*

A. McGILL, *Assistant Examiner.*